(No Model.)

C. J. RYBERG.
CASH REGISTER.

No. 588,733.   Patented Aug. 24, 1897.

Witnesses  
Inventor  
Charles J. Ryberg  
by Bond, Adams, Pickard & Jackson  
Attys.

(No Model.)

6 Sheets—Sheet 3.

C. J. RYBERG.
CASH REGISTER.

No. 588,733.

Patented Aug. 24, 1897.

Fig 3.

Witnesses

Inventor
Charles J. Ryberg
by Bond, Adams, Pickard & Jackson
Attys.

(No Model.) 6 Sheets—Sheet 4.

C. J. RYBERG.
CASH REGISTER.

No. 588,733. Patented Aug. 24, 1897.

Fig 4.

Fig 5.

Witnesses
Wm. F. Henning
Geo. N. Sheern

Inventor
Charles J. Ryberg
by Bond, Adams, Pickard & Jackson
Attys (No Model.) 6 Sheets—Sheet 5.
C. J. RYBERG.
CASH REGISTER.
No. 588,733. Patented Aug. 24, 1897.
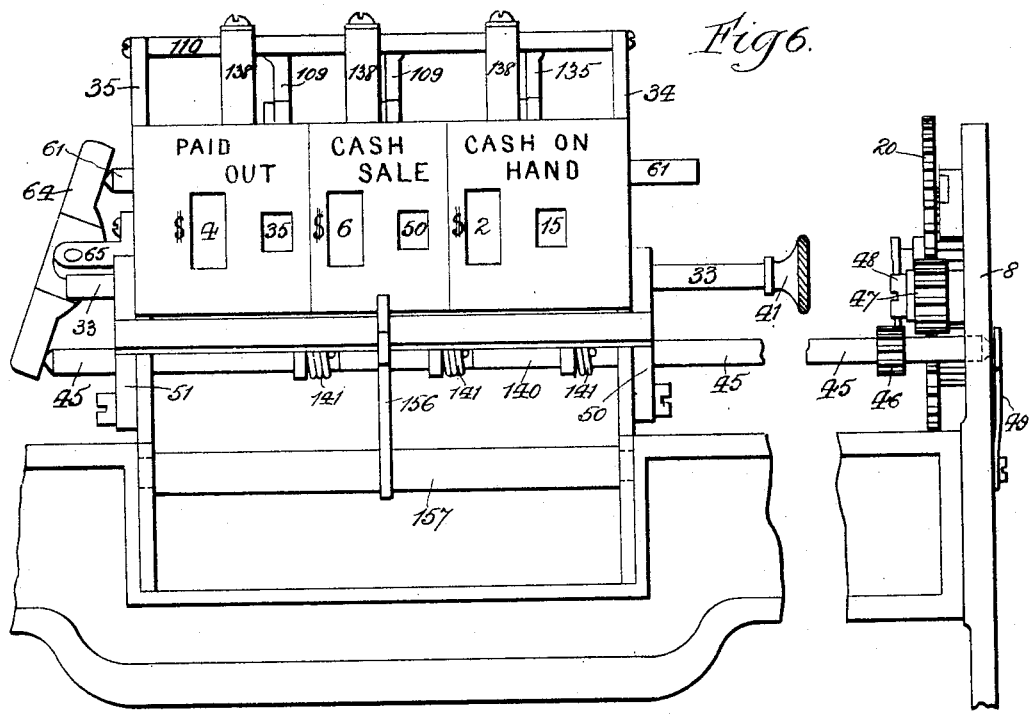
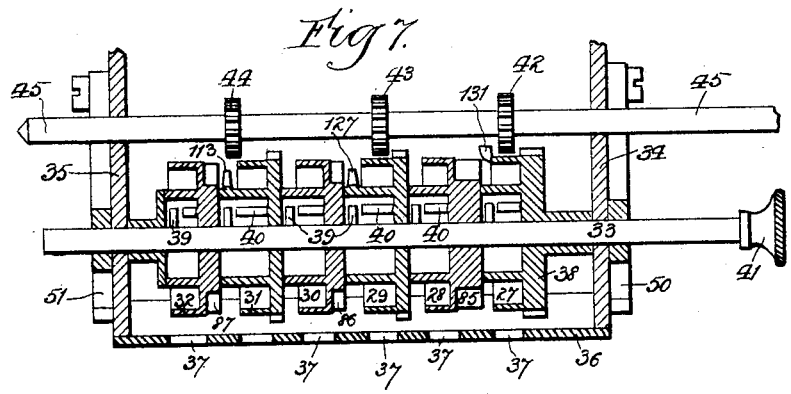
Witnesses
Wm. F. Henning
Wm. N. Rheem
Inventor
Charles J. Ryberg
by Bond, Adams, Pickard & Jackson
Attys.

(No Model.) 6 Sheets—Sheet 6.
C. J. RYBERG.
CASH REGISTER.
No. 588,733. Patented Aug. 24, 1897.
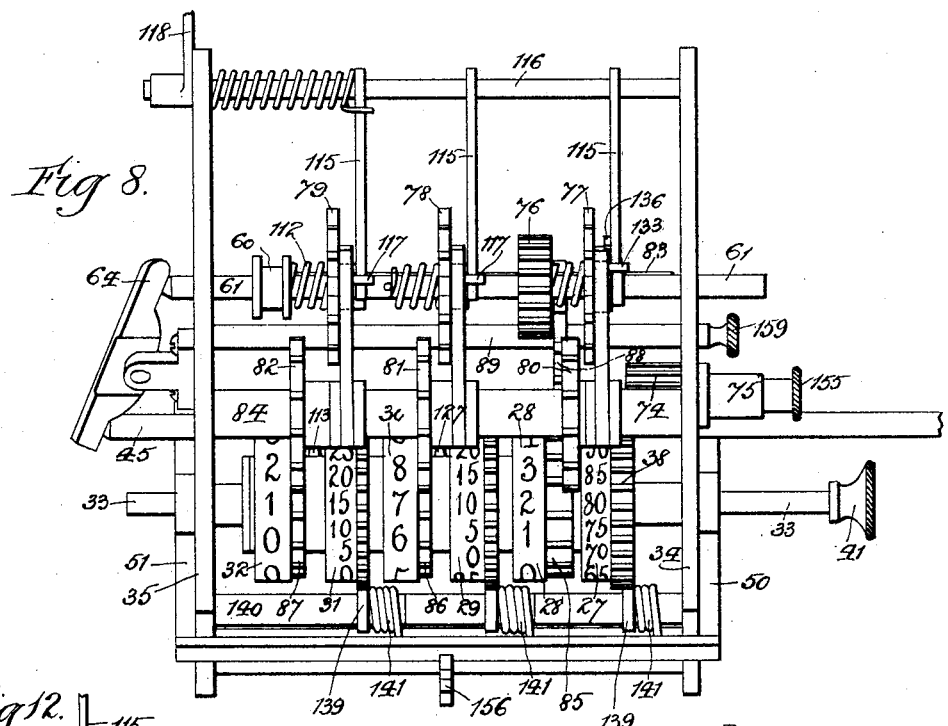
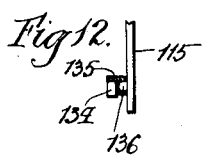
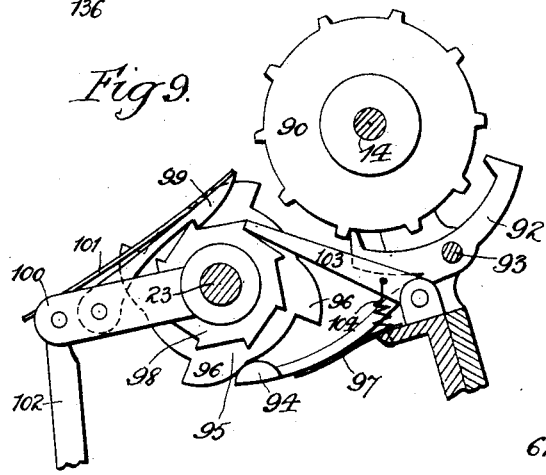
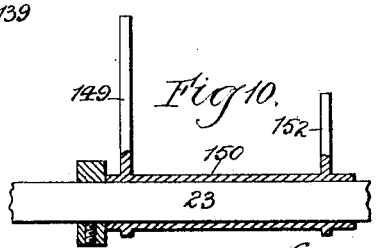
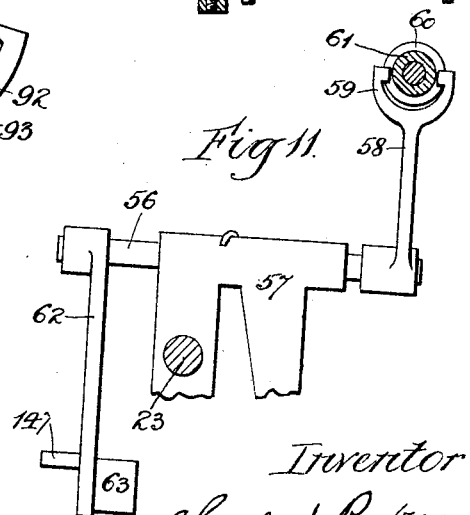
Witnesses
Inventor
Charles J. Ryberg
by Bond, Adams, Pickard & Jackson
Attys.

UNITED STATES PATENT OFFICE.

CHARLES J. RYBERG, OF CHICAGO, ILLINOIS, ASSIGNOR TO HIMSELF AND JOHN L. JACKSON, OF SAME PLACE.

CASH-REGISTER.

SPECIFICATION forming part of Letters Patent No. 588,733, dated August 24, 1897.

Application filed February 5, 1894. Serial No. 499,214. (No model.)

*To all whom it may concern:*

Be it known that I, CHARLES J. RYBERG, a citizen of the United States, residing at Chicago, in the county of Cook and State of Illinois, have invented certain new and useful Improvements in Cash-Registers, of which the following is a specification, reference being had to the accompanying drawings, in which—

Figure 1:
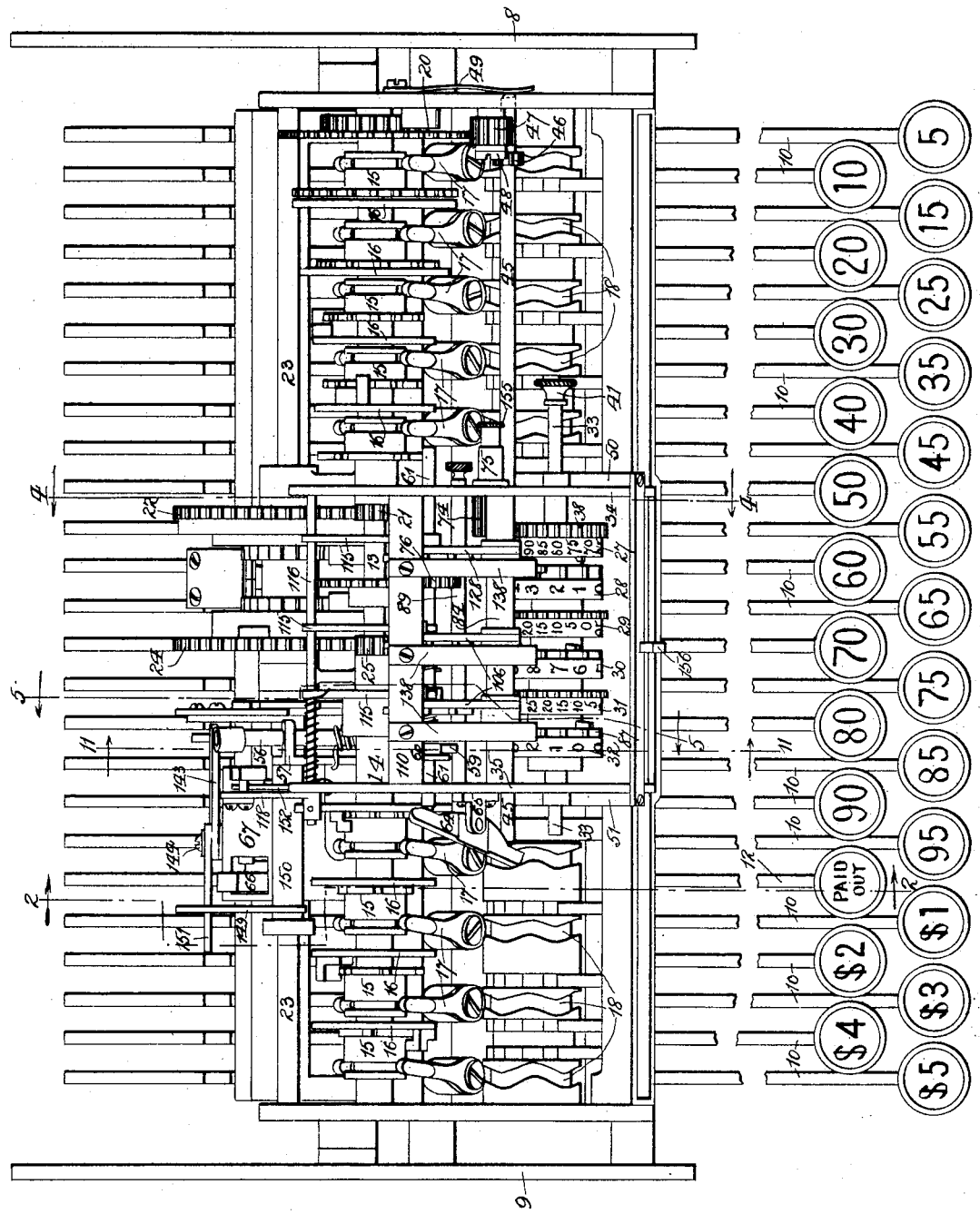
Figure 2:
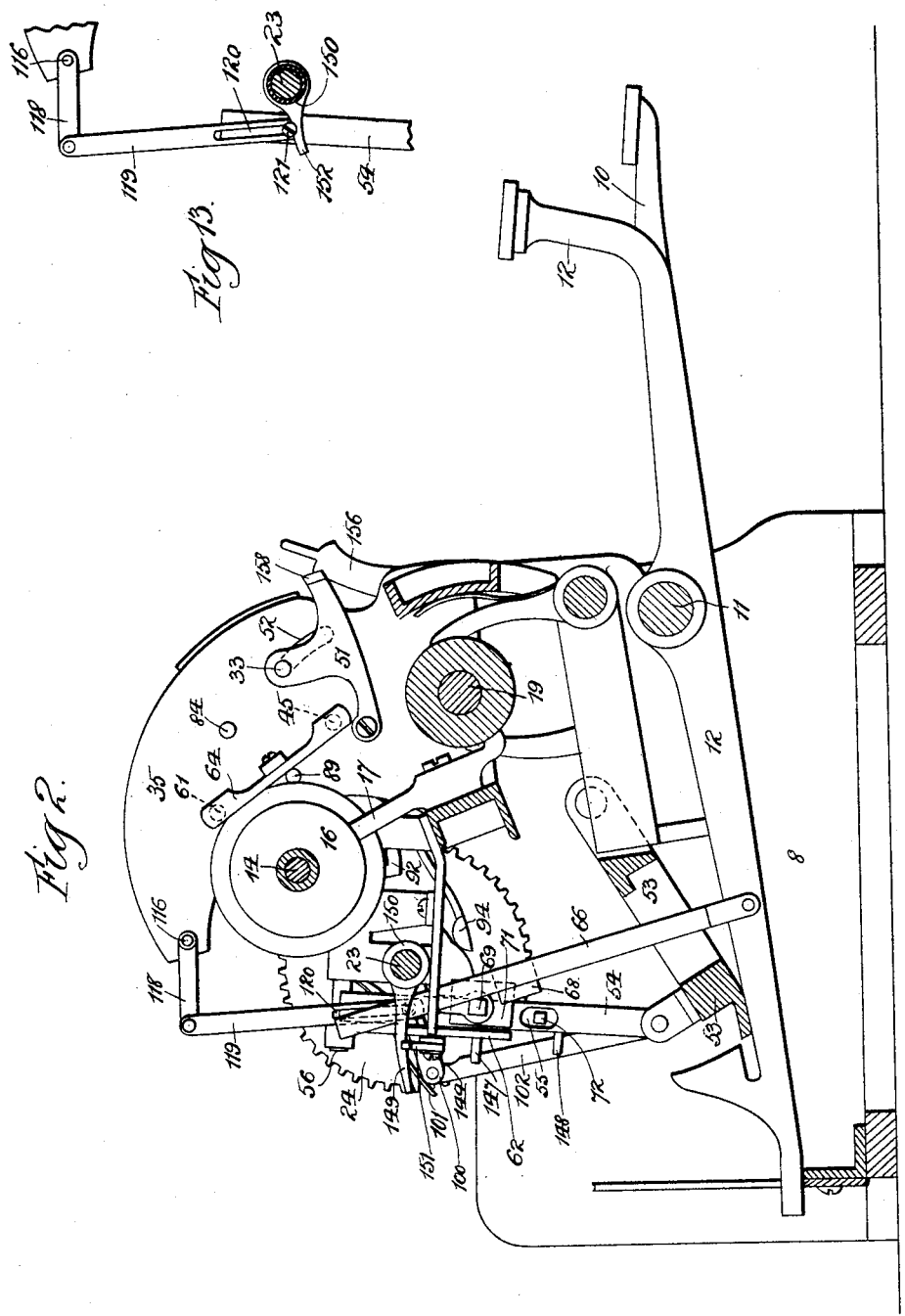

Figure 1 is a plan view of my improved register. Fig. 2 is a vertical cross-section on line 2 2 of Fig. 1. Fig. 3 is a partial rear elevation showing my improvements. Fig. 4 is a partial vertical cross-section on line 4 4 of Fig. 1. Fig. 5 is a partial vertical cross-section on line 5 5 of Fig. 1. Fig. 6 is a front view of part of the register, showing my improvements. Fig. 7 is a longitudinal section on line 7 7 of Fig. 5. Fig. 8 is a horizontal section on line 8 8 of Fig. 3. Fig. 9 is a partial vertical section on line 9 9 of Fig. 3, looking to the left. Fig. 10 is a partial longitudinal horizontal section on line 10 10 of Fig. 3. Fig. 11 is a partial vertical cross-section on line 11 11 of Fig. 1. Fig. 12 is a detail, being a partial horizontal section on line 12 12 of Fig. 4. Fig. 13 is a detail, being a partial sectional view on line 13 13 of Fig. 3.

My invention relates to cash-registers, and particularly to such registers having mechanism for registering various items, the different registering devices being adapted to be operated through a single series of register-keys.

My present invention consists in certain modifications and improvements of the register described in my application filed May 13, 1893, Serial No. 474,142, and has for its object the application of mechanism for registering cash-sales, cash on hand, and cash paid out, or other items involving both the processes of addition and subtraction, to registers in which springs are used as the motive power for effecting the registration upon the operation of the register-keys. I accomplish this object as hereinafter specified and as illustrated in the drawings.

That which I regard as new will be set forth in the claims.

In my present application I have shown my invention as applied to a cash-register similar to that described in Letters Patent of the United States Nos. 450,364 and 450,365, granted to Hugo Cook April 14, 1891, in which register there are two shafts, each carrying a train of scape-wheels, one of which shafts carries a cent-register wheel and is driven by a spring-impelled motor-wheel, the other shaft carrying a dollar-registering wheel, which shaft is driven by a second spring-impelled motor-wheel. Through intermediate mechanism the actuation of the different register-keys operates to permit the escapement of the different scape-wheels, and consequently causes the registration of an amount corresponding to that of the key operated.

As my improvements have nothing to do with the mechanism for controlling the scape-wheels above referred to by the actuation of the register-keys, I do not consider it necessary to fully illustrate such portions of the mechanism in detail and will describe only such parts as relate to my improvements and are necessary to a clear understanding of the same.

Referring to the drawings, 8 9 indicate the end plates of the register-frame, which are so arranged as to support the various parts of the register.

10 indicates the register-keys, which are mounted upon a shaft 11, supported by the end plates 8 9. In addition to the register-keys 10 an extra key 12 is provided, which is actuated for the purpose of registering cash paid out, as will be hereinafter described. The key 12 is also mounted upon the shaft 11.

As shown in Fig. 1, the keys at the right-hand side of the machine are numbered in multiples of five from "5" to "95," while at the left-hand side of the machine are five keys for registering from "$1" to "$5."

Suitably mounted in the frame of the machine are two shafts 13 14, which are practically in line with each other and extend across the machine, their inner ends terminating about the center of the machine, as best shown in Fig. 3. The shaft 13 carries a series of scape-wheels 15 and pallet-wheels 16, the scape-wheels being adapted to be shifted laterally to coöperate with the pallet-wheels for the purpose of permitting the proper escapement of the scape-wheels. The scape-wheels are shifted laterally by means of rocking levers 17, operated by cam-wheels 18, mounted upon a suitable shaft 19, as best shown in Figs. 1 and 2. The rotation of the cam-wheels 18 is effected by the actuation of the register-keys. At its outer end the shaft 13 carries a cent-wheel 20, which is fixedly mounted upon it, as shown in Fig. 1.

21 indicates a pinion which is fixedly mounted upon the shaft 13 near its inner end and meshes with the teeth of a spring-actuated motor-wheel 22, mounted upon a shaft 23 at the rear of the machine, as shown in Figs. 1 and 4.

For the purposes of this specification it is sufficient to state that by actuating any of the cent-keys 10 the scape-wheels 15 upon the shaft 13 will be so operated as to permit the rotation of said shaft to such an extent as to rotate the cent-register wheel 20, so as to effect the proper registration, the rotation of such shaft being effected by the motor-wheel 22, acting through the pinion 21. Mounted upon the shaft 14 is a second series of scape-wheels 15 and pallet-wheels 16, which are operated by the actuation of the dollar-keys, their operation being effected through rocking levers 17 and cam-wheels 18 in the same manner as that above described for the scape and pallet wheels upon the shaft 13. The escapement of the scape-wheels 15 permits the rotation of the shaft 14, impelled by a second spring-actuated motor-wheel 24, which is also mounted upon the shaft 23 and acts upon the shaft 14 through a pinion 25, which is mounted upon said shaft. The rotation of the shaft 14 is communicated to the register-wheels and the proper registration effected by means of a dollar-wheel 26, which is mounted upon and keyed to the shaft 14, as best shown in Fig. 3. The arrangement of the register-wheels and the manner in which the dollar-wheel 26 acts upon them will be more fully hereinafter set forth.

27 28 indicate the cent and dollar registering wheels, respectively, which register cash on hand.

29 30 indicate the cent and dollar registering wheels, respectively, which register cash sales.

31 32 indicate the cent and dollar registering wheels, respectively, which register cash paid out. (See Figs. 6 and 7.)

The registering-wheels 27 28 29 30 31 32 are loosely mounted upon a shaft 33, which is journaled in suitable bearings formed in arms 50 51, pivotally secured to the end pieces 34 35 of a suitable frame which is secured centrally upon the front part of the register, as shown in Figs. 1 and 2. The ends of the shaft 33 project through suitable slots 52 in the end pieces 34 35, as best shown in Fig. 2. By this arrangement the shaft 33, bearing the registering-wheels, may be moved in the arc of a circle, the object of which arrangement will be hereinafter set forth.

36 indicates a plate which is secured to the end pieces 34 35 in front of the various registering-wheels and is provided with a series of sight-openings 37, through which the readings of the various register-wheels may be seen.

Secured to each of the cent-register wheels is a pinion 38, the various pinions preferably being formed integral with their respective wheels.

For the purpose of resetting, the shaft 33 is provided with a series of pins 39, which are adapted to be moved into and out of engagement with a series of lugs 40, carried by the different registering-wheels by the longitudinal movement of said shaft, the arrangement being such that by moving the pins 39 into engagement with the lugs 40 and rotating the shaft 33 by a suitable finger-piece or knob 41 the registering-wheels may all be set so that "0" will appear at the sight-openings 37.

As best shown in Fig. 1, the cent-registering wheels 27 29 31 are numbered on their peripheries in multiples of five from "0" to "95," while the dollar-wheels are numbered from "0" to "9." The cent-registering wheels of the different item-registers are operated from the cent-wheel 20 through the instrumentality of pinions 42 43 44, which are fixedly mounted upon a shaft 45, which shaft is mounted in suitable bearings at the front of the register and carries near its right-hand end a pinion 46, which is adapted to mesh with a pinion 47, meshing with the cent-wheel 20, as best shown in Figs. 1 and 6. The pinion 47 is mounted upon a stud 48, secured in the end plate 8. The shaft 45 is adjustable longitudinally for the purpose of moving the pinion 46 into mesh with the pinion 47 and the pinions 42 43 44 into mesh with the pinions of their respective cent-registering wheels. The pinions 42 43 are so mounted upon the shaft 45 that they will simultaneously move into and out of mesh with their respective cent-registering wheel-pinions; but the pinion 44, which is adapted to mesh with the pinion of the registering-wheel which registers cents paid out, is so mounted upon the shaft 45 that a greater movement of said shaft will be required to move it into mesh with its pinion 38 than is necessary to move the pinions 42 43 into mesh with their respective pinions 38, so that when the pinion 44 is in mesh with its pinion 38 the pinions 42 43 will have been moved beyond their pinions 38, as illustrated in Fig. 7. The shaft 45 is held normally in such position that all the pinions carried by it are out of mesh, as shown in Fig. 6, by means of a spring 49, which is secured upon the end plate 8 and bears against one end of the shaft 45.

The shaft 45 is shifted longitudinally for the purpose of moving the pinions 42 43 into mesh with their respective registering-wheels by the actuation of the ordinary register-keys, which act to effect such shifting of the shaft 45 through the instrumentality of the following mechanism:

53 indicates a swinging universal bar which is pivotally secured to the end plates 8 9 and extends over all the register-keys, the arrangement being such that by actuating any of the keys the universal bar 53 will be rocked upward.

54 indicates a bar which is pivotally connected at its lower end to the universal bar 53 and rises therefrom in a substantially vertical position. At a suitable point the bar 54 is provided with a pivoted cam 55, as shown in Fig. 3.

56 indicates a rock-shaft which is mounted in a suitable bracket 57 and extends at right angles to the shaft 45.

58 indicates an arm carried by the rock-shaft 56 and rising therefrom, which arm is provided at its upper end with a fork 59, which is adapted to enter a suitable groove in a collar 60, as best shown in Fig. 3. The collar 60 is fixed to a shaft 61, journaled in the end plates 34 35 near the upper portion thereof, as best shown in Fig. 3. By rocking the shaft 56 the shaft 61 may be longitudinally moved in its bearings. The shaft 56 is rocked by means of a depending arm 62, which is rigidly connected thereto and terminates in proximity to the bar 54, as shown in Fig. 3. The arm 62 is provided near its lower end with a block 63, which is adapted to be engaged by the cam 55, carried by the bar 54, when said bar 54 is moved upward by the upward swinging of the universal bar 53 incident to the actuation of the register-keys. When the shaft 61 is moved longitudinally by the actuation of the register-keys, as above described, the shaft 45 will be moved in the opposite direction through the medium of a rocking lever 64, which is pivoted to a suitable standard 65, secured to the end plate 35, as best shown in Fig. 6. The ends of the lever 64 project over the adjacent ends of the shafts 61 45, as best shown in Figs. 2 and 6, so that when either shaft is moved longitudinally the other will be moved in an opposite direction. The spring 49 therefore serves to hold the shafts 45 61 normally in the position shown in Fig. 6.

The extent of the longitudinal movement of the shafts 61 45 which is effected through the operation of any of the common register-keys—that is, any of the keys except the "Paid-out" key—is such as to move the pinions 42 43 into mesh with their respective cent-registering wheel-pinions 38 and the pinion 46 into mesh with the pinion 47, so that the movement of the cent-wheel 20, effected by the actuation of any common register-key alone, will be communicated to the "Cash-sale" and "Cash-on-hand" cent-registering keys and the proper registration thereby be made.

For the purpose of registering cents paid out the "Paid-out" key is actuated simultaneously with the actuation of the key bearing the number of the amount to be registered, the shaft 45 being shifted the additional distance necessary to effect the engagement of the pinion 44 with its cent-registering wheel by the actuation of the "Paid-out" key. For this purpose the "Paid-out" key is provided at its rear portion with a bar 66, which is pivoted to said key 12 and rises therefrom, its upper end passing through a suitable hole in a supporting-plate 67, as shown in Fig. 1. The bar 66 is provided at one side with a cam 68, which is adapted when the bar 66 is moved vertically to engage the beveled end of a pin 69, carrying a vertical plate 70, as shown in Fig. 3, the arrangement being such that when the cam 68 engages the end of the pin 69 said pin will be moved laterally. The pin 69 is mounted in a suitable bracket 71, arranged near to and at one side of the bar 54. The lower edge of the plate 70 is beveled.

When the "Paid-out" key is actuated, the bar 66 will be moved upward, causing the cam 68 to strike the pin 69 and moving the plate 70 into close proximity to the bar 54. At the same time the actuation of the "Paid-out" key will have caused the universal bar 53 to swing upward, elevating the bar 54 and causing the cam 55 to move past the plate 70. The cam 55 is provided with a pin 72, which projects through a suitable hole in the bar 54, as shown in Fig. 3. The pin 72 is of such length that when the plate 70 is in its normal position—that is, at its greatest distance from the bar 54—the pin 72 will not come into contact with it, but when the plate 70 is moved into close proximity to the bar 54, as above described, the pin 72 will strike it in passing and will be forced back, thereby swinging the cam 55 outward from the bar 54, and consequently causing the rock-shaft 56 to rock further, and the longitudinal movement of the shafts 61 45 will be increased. The adjustments are such that the operation above described will result in moving the pinion 44 into mesh with its pinion 38. Upon the release of the "Paid-out" key the plate 70 will be restored to its normal position by a spring 73, as best shown in Fig. 3.

The pinions 46 47 are of such width that when the shaft 45 is moved to throw the "Paid-out" registering mechanism into operative position they will still remain in mesh.

In order that the reading of the "Cash-on-hand" registering-wheels may be correct, it is necessary that when the "Paid-out" registration is made the amount paid out should be subtracted from the indication of the "Cash-on-hand" registering-wheel. To effect such subtraction when only the reading of the cent-registering wheel must be altered, a pinion 74 is provided, which is mounted upon a stud 75, secured to the end plate 34. The stud 75 is best shown in Figs. 1 and 4. The pinion 74 is so placed as to be always in mesh with the "Cash-on-hand" cent-registering wheel except when the registering-wheels are thrown into position for resetting, as will be hereinafter described. The pinion 74 is also in position to be engaged by the pinion 42 when such pinion is moved to the position which it assumes when the "Paid-out" key is operated, the pinion 74 being of sufficient width to permit of such engagement. Whenever a "Paid-out" registration is made, such registration will be communicated to the "Cash-on-hand" cent-registering wheel through the pinions 42 74; but through the instrumentality of the intermediate pinion 74 such registering-wheel will be reversely rotated.

The mechanism for subtracting the amount paid out from the "Cash-on-hand" cent-registering wheel when such subtraction requires the alteration of the reading of the "Cash-on-hand" dollar-registering wheel will be hereinafter described.

When one of the dollar-register keys is operated, the dollar-register wheels are operated, being driven by the dollar motor-wheel 24, acting upon the pinion 25, mounted upon the shaft 14. The degree of rotation of the shaft 14 is determined by the escapement devices, as above described.

The rotation of the shaft 14 is communicated to the dollar-register wheels 28 30 32 by the following mechanism: The gear 26, which is mounted upon the shaft 14, meshes with a pinion 76, mounted upon and keyed to the shaft 61, as best shown in Figs. 3 and 8. Also mounted upon the shaft 61 are three pinions 77 78 79, which are adapted to mesh, respectively, with pinions 80 81 82, which are mounted upon a shaft 84, arranged parallel to the shaft 61 and mounted in the end plates 34 35, as best shown in Fig. 8. The pinions 80 81 82 mesh, respectively, with pinions 85 86 87, which are rigidly secured, respectively, to the dollar-registering wheels 28 30 32, as best shown in Fig. 7. I prefer to make the pinions 85 86 87 integral with their respective registering-wheels, but I do not wish to limit myself to such construction. The pinions 77 78 79 are normally out of mesh with their respective pinions 80 81 82, as best shown in Fig. 8. As best shown in Fig. 3, the pinions 77 78 79 are mounted upon a feather 83 upon the shaft 61, so that they will be free to move longitudinally of said shaft, but will rotate therewith. As shown in Fig. 3, the pinion 76 is broad enough so that it will remain in mesh with the gear 26 at all times notwithstanding the longitudinal movement of the shaft 61, hereinbefore described. The position of the pinions 77 78 79 upon the shaft is such that by the longitudinal movement of the shaft 61, effected when any of the common register-keys are operated, the pinions 77 78 will be moved into mesh with their respective pinions 80 81, and consequently will be in train with the "Cash-on-hand" and "Cash-sale" registering-wheels, respectively, and the proper registration will be indicated, since the register-wheels will be rotated the proper amount by means of the gear 26. When the "Cash-paid-out" register-key is operated, the shaft 61 will be shifted laterally far enough to move the pinions 77 78 beyond their respective wheels 80 81, while the pinion 79 will be moved into mesh with its pinion 82 and will be in train with the "Paid-out" registering-wheel, so that the amount paid out will be properly indicated by such wheel.

In order that the reading of the "Cash-on-hand" registering-wheel will be corrected, as is necessary when cash is paid out, when the pinion 77 is moved beyond the pinion 80, as above stated, it will move into mesh with a broad pinion 88, which is mounted upon a shaft 89, supported by the end plates 34 35, and is constantly in mesh with the pinion 80. As best shown in Fig. 4, the pinion 88 is placed below the pinions 77 80 and is so arranged as to project laterally beyond the pinion 80 in such manner that when the pinion 77 is moved beyond the pinion 80, as above stated, it will move into mesh with the pinion 88. By this arrangement the pinion 88 will be rotated equally with the pinion 79, but in an opposite direction, and as it is in mesh with the pinion 80 such pinion will be rotated equally with the pinion 82, but in an opposite direction. The "Cash-on-hand" dollar-registering wheel will therefore be reversely rotated sufficiently to subtract the amount paid out.

The mechanism thus far described is sufficient to insure proper registration in all cases except where the amount to be added is equal to or greater than the difference between the reading of the cents-register wheels and one dollar, or, in the case of subtraction, where the amount to be subtracted is greater than the difference between the reading of the cents-register wheels and one dollar, counting backward. For instance, in case of addition, if the indication of any cents-register wheel is "$1.90" and twenty cents is added the register-wheels should indicate "$2.10," or, in case of subtraction, suppose the "Cash-on-hand" register-wheel to indicate "$2.10" and twenty cents is paid out, the "Cash-on-hand" register should then read "$1.90," and to effect the proper registration it is necessary that the "Cash-on-hand" dollar-registering wheel be turned back to "1" and the "Cash-on-hand" cent-register wheel be turned back to "90." To provide for effecting the proper registration under such circumstances, the following mechanism is used.

As has been before stated, the shaft 14 is rotated by the motor-wheel 24, acting through the pinion 25, but the rotation of the shaft 14 is controlled by a series of scape-wheels 15 and pallet-wheels 16, the outermost scape-wheel 15 being keyed to the shaft 14, as best shown in Fig. 9. The operating mechanism is so arranged that when any of the dollar-keys is actuated the corresponding scape-wheel will be shifted laterally, permitting the said wheel to escape, and thereby permitting the shaft 13 to be rotated the corresponding amount under the influence of the motor-wheel 24. The details of such operating mechanism are fully set forth in Letters Patent No. 450,365, hereinbefore referred to.

90 indicates a scape-wheel which is mounted upon a sleeve 91 upon the shaft 14 and is rigidly connected to the innermost pallet-wheel 16, as best shown in Figs. 1 and 9. By this arrangement when the scape-wheel 90 is permitted to escape, as will be hereinafter set forth, the rotation of the shaft 14 will be permitted.

92 indicates a pallet which is mounted upon a shaft 93, suitably secured in the frame of the machine under the scape-wheel 90 in such position that the teeth of the pallet 92 may engage the teeth of such scape-wheel. The arrangement of the pallet 92 is such that each movement of the pallet will permit the scape-wheel 90 to escape one-half the distance between consecutive teeth.

94 indicates an arm which is connected to the pallet 92 and projects rearwardly therefrom, as best shown in Fig. 5.

95 indicates a cam-wheel which is mounted upon the shaft 23 in position to be engaged by the end of the arm 94, as shown in Fig. 5. The cam-wheel 95 is provided with a series of lugs 96, arranged at regular intervals upon its periphery, which lugs project sufficiently to move the arm 94 outward sufficiently to actuate the pallet 92. The cam-wheel 95 rotates in the direction indicated by the arrow in Fig. 5, so that after being moved outward by the lugs 96 the arm 94 is permitted to move suddenly into the depression immediately following said lugs, thereby moving the pallet 92 in the opposite direction and permitting the escape of the scape-wheel 90. A spring 97 which bears against the under side of the arm 94 serves to effect the return or upward movement of the arm 94.

The cam-wheel 95 is rotated by means of a ratchet-wheel 98, which is rigidly secured to one side of said cam-wheel, as best shown in Fig. 9. The ratchet 98 is rotated by means of a pawl 99, carried by a lever 100, pivoted upon the shaft 23. The pawl 99 is held in engagement with the ratchet-wheel 98 by a spring 101, carried by the lever 100, as shown in Figs. 5 and 9. The outer end of the lever 100 is connected by a bar 102 to the universal bar 53, the arrangement being such that when any of the register-keys are operated the pawl 99 will be moved to engage the next succeeding ratchet-tooth, and upon the return of the universal bar 53 to its normal position the ratchet-wheel 98 and cam-wheel 95 will be rotated the space of one tooth of the ratchet-wheel. As shown in Fig. 10, the cam-wheel 95 is provided with four lugs or cam projections 96, and the ratchet-wheel 98 is provided with eight teeth, so that upon the actuation of a register-key the arm 94 will be moved to the summit of one of the lugs 96 and upon the next actuation of a key to the center of the depressed portion of the cam-wheel 95 between successive lugs, thereby providing for the escape of the scape-wheel 90 one-half the distance between successive teeth upon each actuation of a register-key.

To prevent backward movement of the cam-wheel 95, I provide a detent 103, which is pivotally mounted in the frame of the machine and bears upon the surface of the ratchet-wheel 98. A spring 104 serves to hold the detent 103 in operative position.

The various gears and pinions through which the rotation of the shaft 14 is communicated to the register-wheels are so proportioned that the rotation of said shaft, permitted at each escape of the scape-wheel 90, will, if the various gears and pinions are in operative engagement, alter the reading of the registers by one dollar—that is, will either add or subtract one dollar, as the case may be. Since, however, the escape of the scape-wheel 90 occurs during the return movement of the register-keys, the pinions 77 78 79 under ordinary circumstances will have moved out of engagement with the pinions 80 81 82, respectively, before the escape of the scape-wheel, and therefore the rotation of the shaft 14, permitted by such escapement, will not be communicated to the registers. When, however, a dollar is to be added to the dollar-registering wheels of any of the three item-registers by reason of the fact that the cents to be added to the cent-registering wheels of such registers when added to the readings of such cent-registering wheel more than equal one dollar, or when a dollar is to be subtracted from the dollar-registering wheel of the "Cash-on-hand" register, as above stated, mechanism is provided whereby the operating-train of the item-register the reading of which is to be altered is retained in operative position during the return movement of the register-key, the operating-trains of the other item-registers being moved out of operative engagement. As the "Cash-sale" and "Cash-paid-out" dollar-registering wheels are rotated only in a forward direction the mechanism for retaining them in operative engagement during the return movement of the register-key for the purpose above stated is similar, and it will therefore be necessary to describe in detail such mechanism in connection with only one of such item-registers. The retaining device of the "Cash-on-hand" dollar-registering-wheel-operating mechanism will be hereinafter described, as it differs in some respects from that of the other item-registers.

105 indicates a collar which is mounted upon the shaft 61 adjacent to the pinion 79, as best shown in Figs. 5 and 8.

106 indicates a locking-plate which is pivoted upon the shaft 84 and is adapted to move in a vertical plane. The plate 106 is provided with a slot 107, through which pass the shaft 61 and collar 105, the lower portion of the slot 107 being of sufficient diameter to receive the collar 105, as shown in Fig. 5. The upper portion of the slot 107 is narrower than the collar 105, but is wide enough to receive the shaft 61. The width of the collar 105 is such that when the shaft 61 is shifted laterally to move the pinion 79 into mesh with the pinion 82 the collar 105 will move clear of the plate 106. If said plate is then rocked, bringing the narrower part of the slot 107 opposite the collar 105, the pinion 79 will be prevented from moving back out of mesh with the pinion 82. The locking-plate 106 is held normally in its upper position by a locking-dog 108, carried by a spring-arm 109, secured to a cross-bar 110 at the upper portion of the machine, as best shown in Fig. 5. The dog 108 enters a recess 111 in the end of the plate 106, as shown in Fig. 5.

A spring 112 upon the shaft 61 serves to press the pinion 79 and collar 105 toward the locking-plate 106 constantly and to effect the return of the pinion 79 to its normal position out of mesh with the pinion 82 as soon as the locking-plate 106 is returned to its normal or upper position.

The locking-plate 106 is rocked downward to lock the pinion 79 in mesh with the pinion 82 by means of a lug 113, carried by the "Paid-out" cent-registering wheel 31, as shown in Figs. 5 and 7. The lug 113 is adapted to strike a lug 114, which projects from the base of the locking-plate 106, and as the "Paid-out" registering-wheels rotate in the direction indicated by the arrow in Fig. 5 when the lug 113 strikes the lug 114 in passing it will move the lug 114 upward, thereby rocking the locking-plate 106 upon the shaft 84, moving said plate to its lower position, and locking the pinion 79 in mesh with its pinion 82, as above described. The lugs 113 114 are so placed that they will come in contact with each other when "95" is visible at the "Paid-out" cent sight-opening, so that if the "Paid-out" cent-registering wheel is moved one point, as would be the case if the five-cent key were actuated, "0" would appear at the sight-opening and the pinion 79 will be locked in engagement with the pinion 82, and will remain locked until said key has returned almost to its normal position. But, as has been hereinbefore set forth, during the return of any key to its normal position the scape-wheel 90 escapes half the distance between consecutive teeth, thereby permitting a sufficient rotation of the shaft 14 to effect the registration of one dollar, and as the pinions 79 82 are in mesh one dollar will be added to the reading of the dollar-registering wheel of the "Paid-out" register.

The locking-plate 106 is returned to its normal position upon the completion of the stroke of the register-keys to release the pinion 79 and permit it to move out of engagement with the pinion 82 by means of an arm 115, which is mounted upon a rock-shaft 116, extending between the plates 34 35, which arm projects under a pin 117, carried by the locking-plate 106, as best shown in Figs. 5 and 8. The rock-shaft 116 is provided with a rearwardly-projecting arm 118, to which is connected a connecting-bar 119, having a slot 120 at its lower end, as shown in Figs. 2 and 11. A pin 121 projects through the slot 120 and is secured to the bar 54, as shown in Figs. 3 and 11.

122 indicates a spring which is mounted upon the shaft 116 and exerts a downward pressure upon the arm 115. When a register-key is actuated, the bar 54 will move upward, moving the pin 121 to the upper portion of the slot 120, permitting the spring 122 to move the arm 115 downward sufficiently to permit the locking-plate 106 to move downward if necessary. Upon the release of the register-key the pin 121 will move downward, and when it reaches the bottom of the slot 120 will cause the shaft 116 to rock, throwing the arm 115 upward, thereby raising the locking-plate 106 to its normal position and releasing the pinion 79. It will be seen that as the pin 121 does not actuate the shaft 116 until it almost reaches the lowermost limit of its stroke the pinion 79 will remain locked until the register-key has returned almost to its normal position. It will be seen, therefore, that the locking-plate 106 will be moved in position to lock the pinion 79 in mesh with the pinion 82 only when the amount added to the cent-registering wheel is more than the difference between the reading of such cent-registering wheel and one dollar, in other cases the locking-plate remaining in its normal position, so that the pinion 79 is permitted to move out of engagement with the pinion 82 under the influence of the spring 112 upon the completion of the downward stroke of the register-key.

The pinion 78, which constitutes part of the "Cash-sale" dollar-registering-wheel train, is locked in mesh with the pinion 81 substantially in the manner above described by means of a locking-plate 123 and collar 124, the collar 124 being of sufficient width to hold the pinion 78 in mesh with the pinion 81. A spring 125 serves to return the pinion 78 to its normal position when released. The locking-plate 123 is also mounted upon the shaft 84 and is provided with a lug 126, adapted to be engaged by a lug 127, carried by the cent-registering wheel of the "Cash-sale" register. The operation of the locking-plate 123 is similar to that of the plate 106, and it will not, therefore, be necessary to describe it more in detail.

The "Cash-on-hand" dollar-registering-wheel pinion 77 is provided with a locking-plate 128, which is similar in many respects to the locking-plates 106 123 and is similarly mounted upon the shaft 84. The locking-plate 128 differs, however, from the others in that it is adapted to be rocked either upward or downward, its normal position being central. The plate 128 is provided with a slot 129, which has an enlarged central portion, the upper portion of the slot being wider than the lower portion, as best shown in Fig. 4.

Mounted upon the shaft 61 adjacent to the pinion 77 is a sleeve 130, one portion of which is turned down so that it is somewhat less in diameter than the other portion thereof, as best shown in Fig. 8. The portion of the sleeve 130 having the greater diameter is adapted to fit into the central portion of the slot 129, but is of greater diameter than the width of the upper portion of said slot, whereas the portion of the sleeve 130 having the less diameter is adapted to enter the upper portion of the slot 129, but is of greater diameter than the width of the lower portion of said slot. The construction of the sleeve 130 is such that by moving said sleeve laterally and tilting the locking-plate 128 downward the shoulder formed on said sleeve, as above described, will serve to hold the pinion 77 at such distance from the locking-plate 128 that it will mesh with the pinion 80. When the sleeve 130 is moved laterally sufficiently to move it entirely out of the slot 129 and the locking-plate 128 is rocked upward, the pinion 77 will be held at a greater distance from the locking-plate 128 and in mesh with the pinion 88.

The locking-plate 128 is rocked by means of a pin 131, carried by the "Cash-on-hand" cent-registering wheel, as best shown in Figs. 4 and 7, which pin is adapted to engage a pin 132, projecting from the base of the locking-plate 128, as shown in Fig. 4. The forward rotation of the cent-registering wheel 27 is in the direction indicated by the arrow in Fig. 4, and when rotating in such direction when the pin 131 engages the pin 132 the locking-plate 128 will be rocked downward, substantially as hereinbefore described with reference to the locking-plates 106 123. The pinion 77 will then be locked in engagement with the pinion 80. Upon the completion of the stroke of the register-key the locking-plate 128 will be returned to its normal position by means of one of the arms 115, mounted on the shaft 116, acting upon a pin 133, carried by the locking-plate 128, as shown in Fig. 4.

When the cent-registering wheel 27 is rotated in a reverse direction, as is the case when the "Paid-out" key is operated, if the pin 131 happens to strike the pin 132 the plate 128 will be rocked in an upward direction, and since the actuation of the "Paid-out" key will have moved the pinion 77 into mesh with the pinion 88 such pinions will be locked in engagement with each other by such upward rocking of the locking-plate 128. The operation of subtracting from the "Cash-on-hand" dollar-wheel is therefore similar to that of adding to it or to the dollar-wheels of the other item-registers.

A dog 134, carried by a spring-arm 135, serves to hold the locking-plate 128 in its various positions.

The pinion 77 is movable longitudinally upon the shaft 61 by a spring 154, similar to the springs 112 125.

For the purpose of releasing the locking-plate 128 and permitting it to return to its normal position the arm 115 is provided with a pin 136, (see Fig. 12,) which is adapted to engage the spring 135 as the arm 115 moves upward to its normal position, pressing back such spring from the locking-plate 128 sufficiently to permit such plate to drop under the action of gravity. The spring 135 is released in time to permit the dog 134 to enter a notch 137, arranged centrally in the end of the locking-plate 128, as shown in Fig. 4. The manner in which the arm 115 is rocked has been above described.

In order to prevent the displacement of the pinions 80 81 82, I provide a series of detents 138, which are supported by the bar 110 and engage said pinions, as shown in Figs. 4 and 5. The cent-registering-wheel pinions are also prevented from becoming displaced by a series of detents 139, mounted upon a shaft 140 and held in engagement with said pinions by springs 141, as best shown in Fig. 5.

142 indicates a detent for preventing displacement of the pinion 88, as shown in Fig. 4.

In order to provide for the proper operation of the register-wheels when the register-keys are operated, it is necessary that the various parts of the operating-train should be thrown into operative engagement as soon as possible after the commencement of the downward movement of the register-keys. For this purpose the cam 55 is so placed upon the bar 54 (see Fig. 3) that it will engage the block 63 during the first third of the downward stroke of the register-keys. After engaging the block 63 the cam 55 moves upward beyond such block, but the return of the arm 62 is prevented by means of a pawl 143, mounted upon a suitable pivot 144, as best shown in Fig. 3. The pawl 143 projects past the arm 62 and is provided with two notches 145 146, which are adapted to receive a pin 147, projecting from the arm 62. The notches 145 146 are so placed that when the pin 147 rests in the notch 145 the shaft 61 will be held in such position that the pinion 79 will be in mesh with the pinion 82 and the pinion 77 will be in mesh with the pinion 88, which engagement results when the "Paid-out" key is operated. When the pin 147 rests in the notch 146, the shaft 61 will be locked in the position by means of which the engagement necessary for the registration of cash sales is effected. Upon the completion of the downward stroke of any of the register-keys the pawl 143 will be moved upward, releasing the pin 147 by means of a pin 148, projecting from the bar 54 in such position as to strike and lift the pawl 143 sufficiently to release the pin 147. The arm 62 will thereby be permitted to return to its normal position, but will again be rocked by the cam 55 as the bar 54 moves downward, such second rocking being effected after about two-thirds of the return movement of the bar 54 has been made. When the arm 62 is again moved downward, it will be again locked by the pawl 143 and will remain locked until the completion of the upward stroke of the register-keys, when it will be released by means of an arm 149, carried by a sleeve 150, mounted upon the shaft 23, which arm 149 projects over an arm 151, secured to the pawl 143 and projecting on the opposite side of the pivot 144, as shown in Fig. 3.

The sleeve 150 is rocked by means of a second arm 152, which projects therefrom under the pin 121 in such position that upon the return of the pin 121 to its lowermost position it will strike the arm 152, thereby rocking the sleeve 150 and tilting the pawl 143 sufficiently to release the pin 147, as best shown in Figs. 3 and 10. The adjustments of the scape-wheel 90, pallet 92, and cam-wheel 95 are such that the scape-wheel 90 will be permitted to escape during the first two-thirds of the return movement of the register-keys. Therefore when the arm 62 is rocked for the second time, as above described, no danger of an improper registration will be incurred, since the scape-wheel 90 will already have escaped. The second rocking of the arm 62, however, serves to shift the shaft 61 longitudinally, releasing the tension of any of the springs 112 125 154 should any of such springs be compressed, as is the case when the pinions adjacent to such springs are locked in engagement with the respective pinions by the several locking-plates. By thus removing the tension of the springs the restoration of the locking-plates to their normal position may be more easily effected, as they are relieved from frictional contact with the hubs of their respective pinions.

The pawl 143 falls into contact with the pin 147 through gravity as soon as any of the register-keys are operated, as its weight is sufficient to rock the sleeve 150 as soon as the pin 121 is raised sufficiently to permit of such rocking.

As has been before stated, the "Cash-on-hand" cent-registering wheel is constantly in mesh with the stationary pinion 74, so that by rotating said pinion by a thumb-nut 155, as shown in Fig. 1, the "Cash-on-hand" cent-registering wheel may be reset as desired. All the registering-wheels may be simultaneously reset by moving the shaft 33 longitudinally to bring the pins 39 into engagement with the pins 40 and then rotating said shaft.

When resetting the various register-wheels, it is necessary to move the pinions of the dollar-registering wheels out of mesh with the pinions 80 81 82, which is accomplished by the following devices: As above described, the shaft 33 is mounted in arms 50 51, pivoted to the end plates 34 35, as shown in Fig. 7. The shaft 33 is normally held in such position as to hold the dollar-wheel pinions in mesh with the pinions 80 81 82 by means of a lever 156, which is pivoted upon a shaft 157, secured at the front of the machine, as best shown in Figs. 4 and 6, and having at its upper end a notch adapted to receive a bar 158, connecting the arms 50 51, as best shown in Figs. 2 and 6. The arrangement is such that when the bar 158 rests in the notch at the upper end of the lever 156 the shaft 33 will be held in the upper ends of the slots 52, thereby holding the dollar-registering-wheel pinions in mesh with their respective pinions 80 81 82. When the lever 156 is thrown forward and downward, the bar 158 and arms 50 51 will be permitted to drop, moving the shaft 33 downward in the slots 52 and moving the dollar-wheel pinions out of mesh.

As it is frequently desirable to retain some cash in the cash-drawer at the opening of the day in order to provide for making change, &c., I provide means for independently resetting the "Cash-on-hand" dollar-registering wheel. This is accomplished by rotating the shaft 89 by means of a thumb-nut 159, as shown in Fig. 8. By rotating the shaft 89 the pinion 88 is rotated, and as such pinion is always in engagement with the "Cash-on-hand" dollar-registering wheel, as above described, such registering-wheel may be set at any desired point.

By the terms "positively" and "negatively" as used in some of the following claims I would have it understood that I refer to the forward and reverse movements, respectively, of the registering devices—that is to say, by "means for positively operating an item-register" I mean that it is operated in a forward direction, as in adding, and in referring to its "negative operation" I mean its operation in a reverse direction, as in subtracting.

While my invention is particularly designed to be applied to cash-registers, many features of it may also be applied to registers of other descriptions and also to adding-machines. Furthermore, I do not wish to be limited to the specific details of construction described, as many modifications may be made without departing from the spirit of my invention.

That which I claim as my invention, and desire to secure by Letters Patent, is—

1. The combination with spring-actuated register-operating mechanism, of a plurality of item-registers, and means for operating a plurality of said item-registers simultaneously, substantially as described.

2. The combination with spring-actuated register-operating mechanism, of a plurality of item-registers, and means for operating a plurality of said item-registers simultaneously by a single actuation of the register-keys, substantially as described.

3. The combination with escapement devices, and a plurality of item-registers adapted to be operated thereby, of means for operating a plurality of said item-registers simultaneously by a single actuation of the register-keys, substantially as described.

4. The combination with spring-actuated register-operating mechanism, of a plurality of item-registers, means for actuating the different item-registers at will, and means for reversely operating certain of said item-registers simultaneously with the forward operation of certain other of said item-registers, substantially as described.

5. The combination with spring-actuated register-operating mechanism, of a "Cash-on-hand" register, a "Cash-sale" register, and means for operating said item-registers simultaneously or separately, whereby the difference between the readings of said registers will indicate the total cash paid out, substantially as described.

6. The combination with spring-actuated register-operating mechanism, of a "Cash-on-hand" register, a "Cash-paid-out" register, and means for operating said item-registers simultaneously or separately, whereby the sum of the readings of said item-registers will indicate the total cash received, substantially as described.

7. The combination with spring-actuated register-operating mechanism, of "Cash-sale," "Cash-on-hand" and "Cash-paid-out" registers, and means for automatically operating said "Cash-on-hand" register when either of the other registers is operated, substantially as described.

8. The combination with spring-actuated register-operating mechanism, of a "Cash-on-hand" register, a "Cash-sale" register, and a "Paid-out" register, and means for simultaneously operating said "Cash-on-hand" register when either of the other registers is operated, substantially as described.

9. The combination with escapement devices, and a plurality of item-registers adapted to be operated thereby, of means for operating a plurality of said item-registers simultaneously, substantially as described.

10. The combination with escapement devices, and a plurality of item-registers adapted to be operated thereby, of means for operating a plurality of said item-registers simultaneously, and means for reversely operating certain of said item-registers, substantially as described.

11. The combination with escapement devices, and a plurality of item-registers adapted to be operated thereby, of means for operating the different item-registers at will, and means for reversely operating certain of said item-registers simultaneously with the forward operation of certain other of said item-registers, substantially as described.

12. The combination with spring-actuated register-operating mechanism, of a plurality of item-registers, a single series of register-keys for operating said registers, said registers being normally out of operative connection with said operating mechanism, and means for throwing certain of said item-registers into operative connection at will, substantially as specified.

13. The combination with spring-actuated register-operating mechanism, and a plurality of item-registers normally out of operative connection with said operating mechanism, of a shiftable shaft, pinions carried thereby and adapted to be moved by the shifting of said shaft to throw said item-registers into operative connection, and means for shifting said shaft to throw any desired item-register into operative connection at will, substantially as described.

14. The combination with spring-actuated register-operating mechanism, and a plurality of item-registers normally out of operative connection with said operating mechanism, of a shiftable shaft, pinions carried thereby and adapted to be moved by the shifting of said shaft to throw said item-registers into operative connection, and means for shifting said shaft automatically upon the actuation of the register-keys, substantially as specified.

15. The combination with spring-actuated register-operating mechanism, of a plurality of item-registers, certain of said item-registers being adapted to be operated either positively or negatively, a shiftable shaft, pinions carried thereby adapted to be moved by the shifting of said shaft to throw the different item-registers into operative engagement, and means for operating certain of said register devices either positively or negatively upon the actuation of the register-keys, substantially as described.

16. The combination with spring-actuated register-operating mechanism, and a plurality of item-registers, certain of said item-registers being adapted to be operated either positively or negatively, of a shaft shiftable into two positions to throw certain of said registering devices into position to be operated in a forward direction, or to provide for the forward rotation of certain of said registering devices simultaneously with the reverse rotation of certain other of said registering devices, and means for shifting said shaft at will, substantially as described.

17. The combination with spring-actuated register-operating mechanism, of a plurality of item-registers, pinions rotating therewith, a shiftable shaft, pinions mounted thereupon and movable into operative connection with said register-pinions by the shifting of said shaft, said pinions being so arranged that when said shaft is moved to a certain position certain of said pinions will be moved into operative connection with certain of said register-pinions so that said registers may be positively operated, and certain of said pinions carried by said shaft being movable into operative connection with certain other of said register-pinions to provide for the forward operation of certain of said registers simultaneously with the reverse operation of certain other of said registers, and means for shifting said shaft at will, substantially as described.

18. The combination with spring-actuated register-operating mechanism, of a plurality of item-registers, each of said item-registers having dollar and cent registering wheels, said registering-wheels being normally out of operative connection with the register-operating mechanism, escapement devices for carrying the extra dollar from each of said cent-registering wheels to the corresponding dollar-registering wheel when the amount to be registered added to the indication of said cent-registering wheel equals or more than equals one dollar, means for throwing said register-wheels into operative connection upon the operation of said register-keys, and means for locking the different register-wheels in operative connection when the extra dollar is to be added, substantially as specified.

19. The combination with spring-actuated register-operating mechanism, of a plurality of item-registers, each of said item-registers having dollar and cent registering wheels, said registering-wheels being normally out of operative connection with the register-operating mechanism, escapement devices for carrying the extra dollar from each of said cent-registering wheels to the corresponding dollar-registering wheel when the amount to be registered added to the indication of said cent-registering wheel equals or more than equals one dollar, means for throwing said register-wheels into operative connection upon the operation of said register-keys, means for locking the different register-wheels in operative connection when the extra dollar is to be added, and means for automatically releasing said register-wheels after the dollar is added, substantially as described.

20. The combination with spring-actuated register-operating mechanism, of a plurality of item-registers, each of said item-registers having dollar and cent registering wheels, said registering-wheels being normally out of operative connection with the register-operating mechanism, certain of said register-wheels being adapted to be positively operated for purposes of addition and reversely operated for purposes of subtraction, escapement devices for carrying the extra dollar from each of said cent-registering wheels to the corresponding dollar-registering wheel when the amount to be registered added to the indication of said cent-registering wheel equals or more than equals one dollar, or subtracting the extra dollar from the dollar-registering wheel, as the case may be, means for throwing said register-wheels into operative connection upon the operation of said register-keys, and means for locking the different register-wheels in operative connection when the extra dollar is to be added or subtracted, substantially as described.

21. In a registering-machine, the combination of two spring-impelled motor-wheels, a cent-registering wheel driven by the first and a dollar-registering wheel driven by the second, a pallet adapted to be rocked by the operation of any of the register-keys, a scape-wheel coöperating with said pallet and geared to said second motor-wheel, a plurality of item-registers, means for operating the different item-registers at will upon the operation of the register-keys, means for automatically locking the dollar-registering wheels in operative connection when an extra dollar is to be added to or subtracted from the registering-wheels, and means for actuating such registering devices from said scape-wheel, substantially as described.

22. In a registering-machine, the combination with two spring-impelled motor-wheels, of a plurality of item-registers, each of said item-registers having a dollar-registering wheel adapted to be driven from one of said motor-wheels and a cent-registering wheel adapted to be driven from the other of said motor-wheels, means for operating said item-registers positively for the purpose of addition, and means for reversely operating certain of said registers for the purpose of subtraction, substantially as described.

23. In a registering-machine, the combination with two spring-impelled motor-wheels, of a plurality of item-registers, each of said item-registers having a dollar-registering wheel adapted to be driven from one of said motor-wheels and a cent-registering wheel adapted to be driven from the other of said motor-wheels, means for operating said item-registers positively for the purpose of addition, and means for reversely operating certain of said registers for the purpose of subtraction simultaneously with the positive operation of certain other of said registers, substantially as described.

24. In a registering-machine, the combination with two spring-impelled motor-wheels, of a plurality of item-registers, each of said item-registers having a dollar-registering wheel adapted to be driven from one of said motor-wheels and a cent-registering wheel adapted to be driven from the other of said motor-wheels, means for operating said item-registers positively for the purpose of addition, means for reversely operating certain of said registers for the purpose of subtraction, and means for adding the extra dollar to said dollar-registering wheels and for subtracting the extra dollar therefrom, as the case may be, substantially as described.

25. In a registering-machine, the combination with two spring-impelled motor-wheels, of a plurality of item-registers, each of said item-registers having a dollar-registering wheel adapted to be driven from one of said motor-wheels and a cent-registering wheel adapted to be driven from the other of said motor-wheels, means for operating said item-registers positively for the purpose of addition, means for reversely operating certain of said registers for the purpose of subtraction simultaneously with the positive operation of certain other of said registers, and means for adding the extra dollar to said dollar-registering wheels and for subtracting the extra dollar therefrom, as the case may be, substantially as described.

CHARLES J. RYBERG.

Witnesses:
JOHN L. JACKSON,
RALPH J. VAN DYKE.